May 16, 1939.   J. A. WIORA   2,158,646
BATTERY CARRIER
Filed March 3, 1938
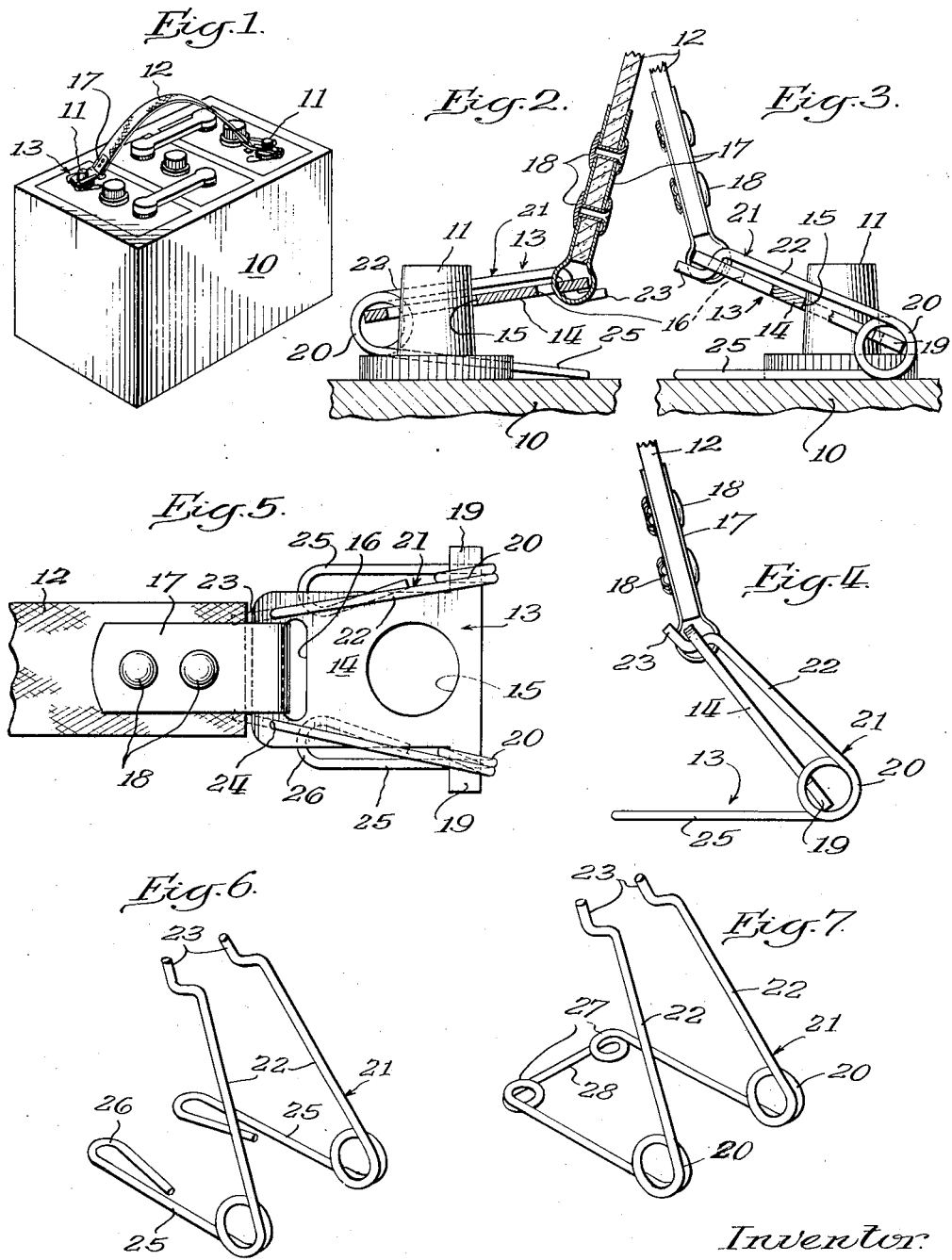

Patented May 16, 1939

2,158,646

UNITED STATES PATENT OFFICE 2,158,646

BATTERY CARRIER

Joseph A. Wiora, Chicago, Ill.

Application March 3, 1938, Serial No. 193,693

4 Claims. (Cl. 294—92)

This invention relates to battery carriers and particularly to battery carriers which include a handle portion and gripping means at the ends thereof adapted to engage the terminals or posts of a battery.

These gripping members are normally in the form of rigid plates provided with openings adapted to receive the battery terminals. When the intermediate carrying member is raised, the gripping members are canted so that the opposite edges of the openings therein effectively grip the battery terminals. The effectiveness of this grip depends upon the substantial weight of the battery. Such battery carriers necessitate a considerable degree of care during the lifting of the battery in order to make sure that the gripping members engage the battery terminals at a suitable location. If the lifting member is elevated carelessly, one or other of the gripping members may not engage the associated battery terminal, or it may engage the battery terminal very near its end so that danger of disengagement during transport is incurred.

According to the present invention I provide an improved carrier in which the gripping means may be applied to the battery terminals in a definite position, the gripping members being held in that position irrespective of whether or not the battery carrier is or is not being used to support the weight of the battery. Consequently, when my improved carrier is applied to a battery it may be grasped and moved instantly without any care on the part of the workman.

The invention will be readily understood from the following description of a preferred embodiment thereof, taken in conjunction with the accompanying drawing, in which:

Figure 1 is a perspective view of a battery with my improved carrier applied thereto;

Fig. 2 is a fragmentary view, showing part of my improved carrier in section, and illustrating the manner in which the gripping means is applied to a terminal;

Fig. 3 is a fragmentary elevational view showing a gripping member in cooperative relation with a battery terminal;

Fig. 4 is a side elevation of a gripping member in disengaged condition;

Fig. 5 is a plan view of one end of my improved carrier;

Fig. 6 is a perspective view showing the springs employed in the improved carrier and Fig. 7 is a perspective view of a modified form of spring which may be used.

Referring to the drawing, the reference numeral 10 designates a conventional storage battery which is provided with a pair of terminals or posts 11 which project upwardly from the upper surface of the battery. My improved carrier comprises a central handle portion 12, which may suitably be in the form of a stout strap. At each end of this strap are two similar gripping members 13 which are adapted to grip the terminal posts 11.

Each gripping member 13 comprises a plate 14 which is provided with an opening 15. The opening 15 is slightly larger in diameter than the usual posts 11, so that when the plate 14 is canted into the position shown in Fig. 3 opposite edges of the opening 15 will dig into the posts 11. It will be understood that when the battery is lifted by the strap 12, the plates 14 being in the position shown in Fig. 3, the gripping effect between opposite edges of the opening 15 of the plate 14 will be caused to grip the terminals 11 very effectively owing to the weight of the battery.

Each plate 14 is provided with a slot 16 adjacent one end and it is secured to the strap 12 by means of a metal band 17. This strap extends through the opening 16 and over the opposite faces of the strap adjacent its end. These opposed portions of the band 17 are secured together by means of rivets 18 which extend through the strap 12.

Adjacent its free extremity each plate 14 is provided with laterally extending lugs 19. Each lug receives the central coil portion 20 of a spring 21. The spring 21 includes one arm 22 which extends upwardly over the upper surface of the plate 14. The arm 22 is secured to the plate 14 by a deformed extremity 23 which extends through an opening 24 in the plate 14 adjacent the inner end thereof.

Each spring 21 comprises another arm 25 which extends inwardly on the under side of the plate. The arm 25 normally makes a substantial angle with the plate 14 and the arm 22, as best seen in Figs. 4 and 6. The ends of the arms 25 are preferably formed into return bends 26, as best seen in Fig. 6. If desired, the two springs may be formed in one piece, as shown in Fig. 7, the return bends 26 being replaced by two coil portions 27 which are connected by a transverse length 28.

It is to be noted with particular reference to Figs. 4, 5 and 6 that the relation of the lugs 19 and the deformed extremities 23 is such that the coil 20 may not be moved over and away from the lug 19 except by the application of exceptional force. Consequently, the springs remain in operative position upon the plate 14 at all times. The spring shown in Fig. 7 is inherently biased so that the coils 20 bear against the opposite sides of the plate 14.

It will be understood that parts of the gripping member have a normal position like that shown in Fig. 4. To apply the gripping member to a terminal 11, the opening 15 of the plate 14 is moved downwardly over the terminal 11 in the manner shown in Fig. 2, the springs being distorted to some extent during this operation. The lengths 25 of the springs move flat upon the upper surface of the battery and the plate 14 is allowed to pivot upwardly into the position shown in Fig. 3, in which position opposite edges of the opening 15 dig into the post 11.

When the battery is elevated by the handle 12, the engagement of the plate 14 with the post 11 is accentuated, but the relation of the parts remains the same as shown in Fig. 3 until the gripping member is manually disengaged from the post 11. This may be done by manually depressing the plate 14 towards the position shown in Fig. 2 and allowing the coil portion 20 of the springs to elevate. In this way the plate 14 is moved towards the postion in which it is transverse to the axis of the post 11 so that the post is no longer gripped. The gripping member may then be moved upwardly.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A battery carrier comprising a pair of gripping members having openings adapted to receive the terminals of a battery, which members are adapted to grip the terminals when canted from horizontal position, and means adapted resiliently to engage the battery and cant the members into gripping relation with the terminals.

2. A battery carrier comprising a pair of gripping members having openings adapted to receive the terminals of a battery, a handle member connecting said gripping members and adapted to force the gripping members into engagemnt with the terminals, and a spring carried by each gripping member adapted to engage the battery and bias said member towards the gripping position.

3. A battery carrier comprising a pair of plates having openings adapted to receive the terminals of a battery, a handle member connecting said gripping members and adapted to force the plates into gripping engagement with the terminals, a pair of lugs on each plate, a spring element secured to the plate having a free portion extending under the plate and biased away therefrom, and a coil portion around a lug.

4. In a battery carrier, in combination, a plate having an opening for receiving a battery terminal, means at one end for the attachment of a handle, a pair of lateral lugs on said plate adjacent the opposite end, a pair of springs each having a coil portion mounted on said lug, means attaching one end of the spring to the plate, and a length extending from said coil portion inwardly below said plate, last said length being angularly displaced from the plate normally to cant the plate from horizontal position.

JOSEPH A. WIORA.